Dec. 14, 1954 G. F. BAROCH 2,697,131

SYNCHRONIZATION SYSTEM

Filed July 28, 1950 3 Sheets-Sheet 1

INVENTOR.
George F. Baroch
BY Thomas L. Mueller
Attys.

INVENTOR.
George F. Baroch
BY
Norman L. Mueller
Atty.

INVENTOR.
George F. Baroch
BY
Norman L. Mueller
Attys.

United States Patent Office 2,697,131

Patented Dec. 14, 1954

2,697,131

SYNCHRONIZATION SYSTEM

George F. Baroch, Lombard, Ill., assignor to Motorola, Inc., Chicago, Ill., a corporation of Illinois Application July 28, 1950, Serial No. 176,309

7 Claims. (Cl. 178—69.5)

The present invention relates to a circuit for synchronizing the output of a source of local oscillation with an incoming or received signal.

More particularly, the invention relates to a synchronization circuit of a television receiver for synchronizing the output of a picture tube scanning signal generator with the synchronizing pulses of a received television signal.

In television receiving systems it is necessary to synchronize the scanning waves applied to the deflecting devices of the receiver, image reproducing picture tube, with the scanning of the picture pickup tube at the signal transmitter, in order to properly reproduce the picture being televised. To accomplish synchronization of the receiver scanning waves, both line or horizontal, and field or vertical synchronizing pulses are superimposed on the transmitted television signal along with the video or picture portion. The synchronizing pulses are then derived in the receiving system, and utilized to provide the necessary synchronized scanning signal.

While there are many known circuits for deriving the synchronizing pulses at the receiver, these circuits have been quite complicated and have not been satisfactory due to the fact that noise or unclipped video pulses accompanying the synchronizing pulses, throw the picture tube scanning waves out of synchronization; thereby resulting in picture distortion. This is particularly troublesome in line or horizontal synchronizing, as the higher scanning rate enhances the possibility of pullout. A known method of correcting this trouble utilizes a synchronized blocking oscillator having a discriminator type AFC circuit to provide the necessary synchronized scanning wave. While such a system operates satisfactorily, it is relatively expensive to construct and therefore undesirable. As an alternative method, a synchronization circuit utilizing a feedback oscillator tuned to the repetition frequency of the received horizontal synchronizing pulses, and having its output locked in phase with such pulses, was disclosed in patent application Serial No. 52,243, filed October 1, 1948, inventor Kurt Schlesinger, which issued on February 10, 1953, as Patent 2,628,313. While the locked in oscillator synchronization circuit has a greatly improved noise rejection characteristic, noise pulses, or unstripped video applied to the locked in oscillator, tend to produce horizontal pulling or carrying of the picture. Difficulty has also been encountered with vertical scanning and experience has shown that in noisy areas and at long distances, vertical bounce or rolling of the picture transmitted occurs, due to improper synchronization of the vertical or field scanning wave with the incoming vertical synchronizing pulses.

It is therefore one object of the present invention to provide an improved synchronization circuit for synchronizing the output of a scanning wave generator with a received pulse wave having a repetition frequency equal to the frequency of the scanning generator.

Another object of the invention is to provide a synchronization circuit for use in a television receiving system wherein improper synchronization caused by noise pulses and the like, and resulting in a horizontal pulling or scalloping of the picture being presented, is prevented.

A further object of the invention is to provide a synchronization circuit for use in a television receiving system wherein, vertical bouncing or rolling of the picture being presented, is prevented.

A still further object of the invention is to provide a synchronization circuit for improving image reproduction of a television receiving system, which is easy and inexpensive to construct.

A feature of the invention is the provision of a synchronization circuit including a locked in oscillator having a frequency equal to the repetition frequency of a received synchronizing pulse, and having gating means coupled to the input circuit for controlling the application of synchronizing pulses thereto.

Another feature of the invention is the provision of a synchronization circuit including means for developing a scanning wave having a frequency equal to the repetition frequency of the received vertical synchronizing pulses, and having a wave shaping circuit coupled to its output for developing a gating signal, the gating signal being utilized to control gating means which in turn controls the application of vertical synchronizing pulses to the input of the scanning wave developing means.

A further feature of the invention is the provision of a synchronization circuit wherein improved synchronization of both the horizontal and vertical scanning waves for use in a television receiver, is accomplished by a system incorporating a fewer number of electron discharge tubes than systems for producing the same general results which are of standard construction.

Other objects, features and many of the attendant advantages of this invention will be better understood after a reading of the following detailed description, taken in connection with the accompanying drawings, wherein.

In practicing the invention, a synchronization circuit for use in a television receiving system is provided. The circuit includes a feedback oscillator tuned to the repetition frequency of the synchronizing pulses of a received television signal, which is locked in phase with the received synchronizing pulse, and that produces pulses in its output for use in triggering a scanning wave developing means. Application of the received synchronizing pulses to the locked in oscillator, is controlled by gating means that is in turn controlled by a gating signal. In one embodiment of the invention, the gating signal is derived from the retrace portion of the output scanning wave, and is utilized to key the gating means on and off; thereby preventing noise pulses, and the like, which are not coincident with the synchronizing pulses, from reaching the locked in oscillator. Gating of the locked in oscillator greatly improves the noise rejection characteristic of the synchronization circuit, and results in a substantial improvement of the picture being reproduced. In a second embodiment of the invention, the gating signal is derived from the received or incoming synchronizing pulses themselves. And, in still another embodiment of the invention, means are provided for gating both the horizontal synchronizing channel, and the vertical synchronizing channel.

Figure 1:
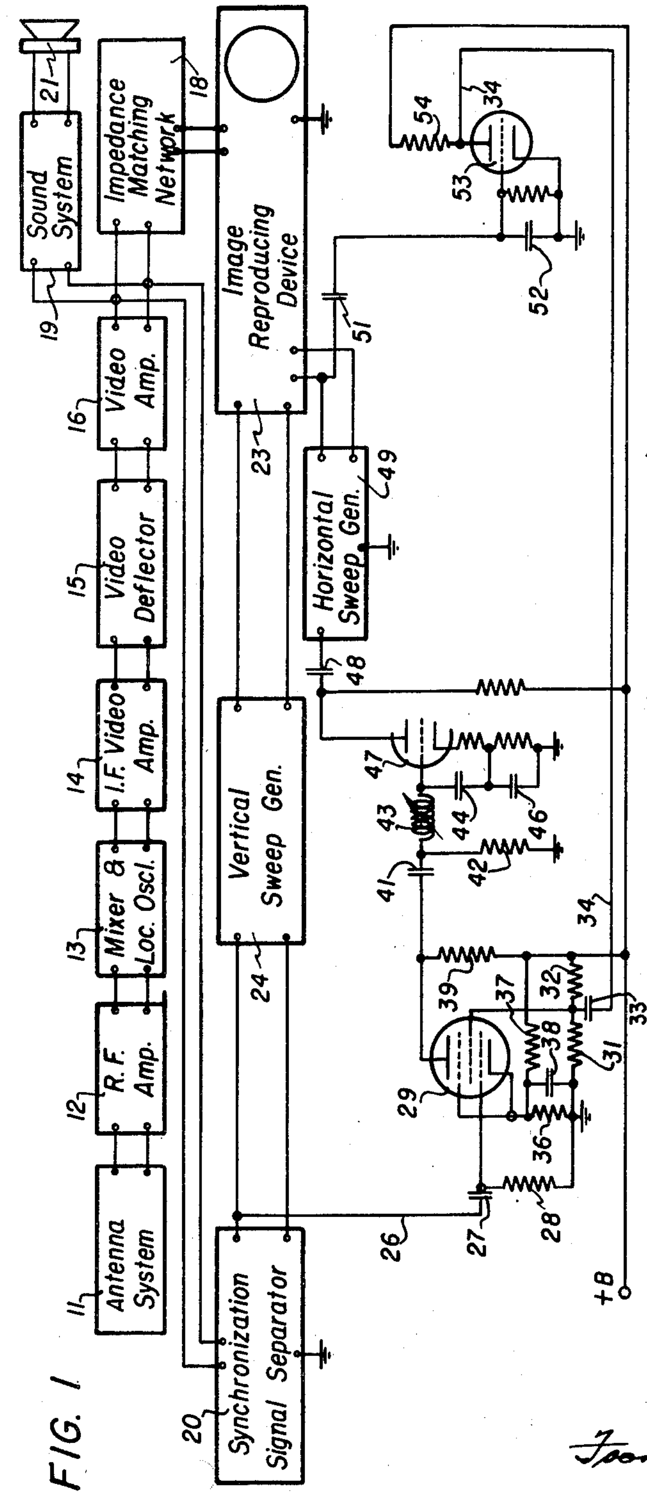
Fig. 1 is a functional diagram of a television receiver with the standard components shown in block form and the improved synchronization circuit constructed in accordance with the invention shown in detail.

Referring now to Fig. 1 of the drawings, a television receiver incorporating a synchronization circuit constructed in accordance with the invention, is shown. The receiver includes an antenna system 11, which is coupled through an R. F. amplifier 12 to the input of a mixer or first detector 13. Mixer 13 reduces the received signal in frequency by the well-known superheterodyning action, and has its output coupled through an I. F. amplifier 14 to a second video detector 15. Video detector 15 derives a composite video signal containing synchronizing pulses from the output of I. F. amplifier 14, and feeds this signal through a video amplifier 16 to an impedance matching network 18, and to a sound system 19, respectively. In the sound system 19, the accompanying audio signal is separated out, amplified, and applied to a loudspeaker 21, by which it is converted into audible sound waves. From the output of impedance matching network 18, the composite video signal is fed to the control grid of an image reproducing device or tube 23 where it is utilized to control the number of electrons reaching the image reproducing, or face portion of the tube.

The composite video signal is also applied to a synchronizing signal separator 20 which derives the line or horizontal synchronizing pulses, and the field or vertical synchronizing pulses. From the output of separator 20, the pulses are coupled to a vertical synchronizing sweep generator 24, and to a conductor 26 respectively. Vertical synchronizing sweep generator 24 serves to separate the vertical synchronizing pulses from the horizontal synchronizing pulses, and use the same to synchronize a sawtooth wave having a frequency equal to the repetition frequency of the vertical synchronizing pulses. The resulting sweep or scanning wave is applied to the vertical deflection means of image reproducnig device 23. The portion of the output signal of separator 20 applied to conductor 26 is coupled to a horizontal pulse synchronization circuit, to be described more fully hereinafter, wherein it is likewise used to synchronize a substantially sawtooth scanning wave which is applied to the horizontal deflection means of the image reproducing device 23. Because of the fact that the general system heretofore described, is well known in the art, further elaboration of its construction, and the manner of its operation, is thought to be unnecessary.

The portion of the stripped video signal applied through conductor 26 is coupled across a differentiating circuit comprising a capacitor 27, and a resistor 28, having a time constant substantially equal to the period of the line, or horizontal synchronizing pulses. The output of differentiating network 27, 28 is taken off resistor 28, and applied to the control grid of gating means comprising a pentode gating tube 29. Pentode 29 has its screen grid connected to a biasing means comprising a voltage dividing network consisting of a pair of resistors 31 and 32 connected across a source of positive potential B+, and the point of connection of the screen grid to the voltage divider 31, 32, is coupled through a capacitor 33 to a conductor 34, the purpose of which will be readily appreciated from the following discussion. Pentode 29 also includes a cathode connected to a biasing network comprising resistors 36 and 37, and capacitor 38, and an anode connected through a load resistor 39 to the source of positive potential B+. Load resistor 39 is coupled through a differentiating network 41 and 42, also having a time constant equal to the period of the line or horizontal synchronizing pulses, to the tank circuit of an oscillator including an inductance 43, a pair of capacitors 44 and 46, and a triode tube 47. The tank circuit is tuned to the repetition frequency of the horizontal synchronizing pulses, and is connected to the control grid and cathode of triode 47 in such a manner as to form a well known Colpitts oscillator. Triode 47 is a high-mu triode that is biased beyond cutoff for each half cycle of the applied grid voltage; so as a result, pulses are obtained in the plate circuit of triode 47 which are in phase with each positive passage of the applied grid voltage. These pulses are applied through a coupling capacitor 48 to horizontal synchronizing sweep sawtooth wave generator 49. The capacitor 48 may form a part of a differentiating circuit, which may also include a plate transformer of the sweep generator. The resulting differentiated pulses may then be utilized to trigger a blocking oscillator which forms a part of the sawtooth wave generator 49. The generator 49 may also include wave shaping circuits for improving the wave form of the developed or scanning wave before the same is applied to the horizontal deflection means of image reproducing device 23.

A portion of the scanning wave developed by sweep generator 49 is also applied across a capacity dividing network 51 and 52 having its midtap connected to the control grid of a triode 53 having its plate connected through a load resistor 54 to the source of positive potential B+. The plate of triode 53 is also connected through conductor 34 and coupling capacitor 33 to the screen grid of pentode gating tube 29 completing the novel gating system comprising a part of the invention.

In operation, the line or horizontal synchronizing pulses are obtained from the stripped video signal applied to conductor 26 by differentiating circuit 27, 28, and applied to the control grid of pentode gating tube 29. Upon starting the system, a positive voltage is applied through voltage divider 31, 32 to the second control electrode or screen grid of pentode 29. This positive voltage is sufficient to allow the pentode 29 to conduct at any time if positive synchronizing pulses are applied to its control grid. Thus, immediately after the system has been first started, synchronizing pulses appear in the output of gating tube 29, and are applied to locked in oscillator 47 for synchronizing its signal with the received synchronizing pulses. Locked in oscillator 47 is then locked in phase with the incoming synchronizing pulses by the locking operation described in the article "Locked oscillator for television synchronization" by Kurt Schlesinger, published in Electronics Magazine, January 1949 issue, pages 112 to 117. Oscillator 47 is biased to operate beyond cutoff for each negative half cycle of the signal applied to its control grid, and produces pulses in its plate circuit which are substantially in phase with the received synchronizing pulses. These pulses are then used to trigger the sweep or scanning signal oscillator contained within generator 49, the output of the scanning oscillator being shaped by circuits contained within generator 49, and applied to the horizontal deflection means of image reproducing device 23. The oscillator 47 is locked in with a plurality of synchronizing pulses, corresponding to a plurality of lines of the picture, and thereby stabilizes the synchronization of the generator 49. The oscillator also permits tuning to provide the desired phase relationship of the generator with respect to the incoming synchronizing pulses.

Figure 2:
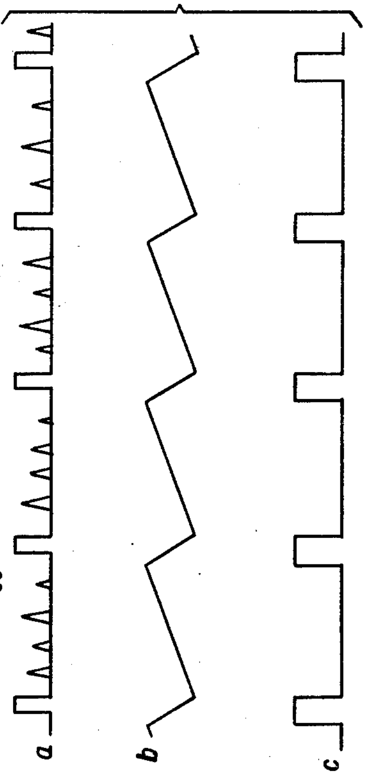
Fig. 2 is a series of graphs representing a signal appearing in different stages in the synchronization circuit illustrated in Fig. 1.

Assuming for the moment that the gating means including tube 29 is absent from the circuit and that differentiating circuit 41, 42 is connected directly to the output of synchronizing signal separator 20 through conductor 26; then the signal utilized to lock in oscillator 47 would appear as shown in curve (*a*) of Fig. 2, and contain composite synchronizing pulses stripped of video, plus any amount of video that might be present due to imperfect stripping in separator 20, and any noise accompanying the video that has a level substantially equal to or greater than the peak sync level. As unstripped video or picture portions of the signal arriving at locked in oscillator 47 results in a horizontal pulling of the picture represented by image reproducing device 23, and noise pulses, particularly noise pulses that coincide with, or slightly ahead of the leading edge of the synchronizing pulses, arriving at locked in oscillator 47, result in a horizontal tearing or scalloping of the picture, and could result in throwing the system completely out of synchronization, this phenomenon is undesirable. To prevent the application of unstripped video and noise pulses to locked in oscillator 47, the gating means including tube 29 is provided.

After the system has been started and left running for a period of time, gating tube 29 is rendered normally non-conductive by a negative voltage built up on capacitor 33 due to screen grid current flow, and is rendered conductive only upon the application of a positive gating pulse developed by tube 53, and applied through conductor 34 to the screen grid. The gating pulses are derived from the negative polarity horizontal retrace portion of the scanning wave, shown in curve (*b*) of Fig. 2, obtained from the output of sweep generator 49 by capacity divider 51 and 52, and therefore are substantially in phase with the leading edge of the incoming synchronizing pulses. In order to produce squared off gating pulses providing limited phase variation in the incoming or received synchronizing pulses, such as those shown in curve (*c*) of Fig. 2, triode 53 is biased so that it is normally conductive, and, upon the application of a large negative voltage to capacity divider 51 and 52, is driven beyond cutoff; thereby producing squared off horizontal gating pulses in its plate circuit. The resulting pulses are then applied to gating tube 29 for controlling the application of incoming synchronizing pulses to oscillator 47. By this means, incoming synchronizing pulses are not applied to oscillator 47 except when the control grid and screen grid of gating tube 29 are driven positive in phase. Because gating tube 29 does not conduct except during the retrace time of the scanning wave, noise pulses or unstripped video are prevented from reaching the plate circuit of gating tube 29, thereby reducing pulling or tearing of the picture due to noise pulses or video by approximately 85%, and resulting in an improvement of the signal to noise ratio of about 6 to 1 in the synchronization channels.

Figure 3:
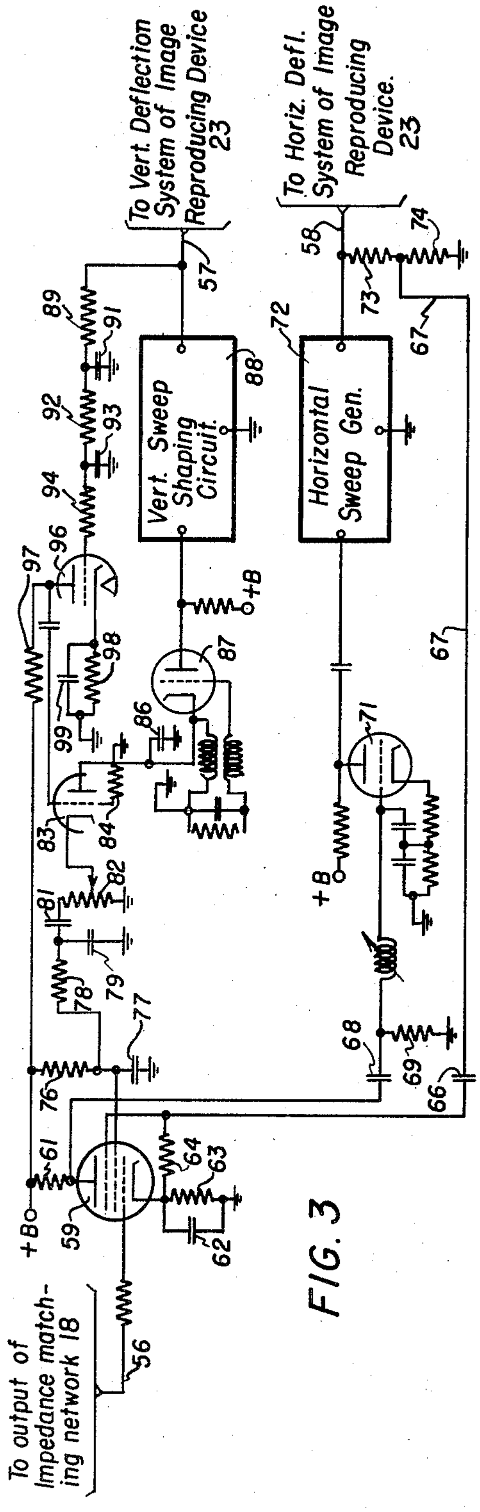
Fig. 3 is a circuit diagram of a modified form of synchronization circuit for use in the system of Fig. 1.

Referring now to Fig. 3, a synchronization circuit is shown, wherein gating of the vertical or field synchronizing pulses, as well as gating of the line or horizontal synchronizing pulses, is accomplished. The circuit is adapted to be embodied in the television receiving system illustrated in Fig. 1, with the conductor 56 being connected to the output of impedance matching network 18, the conductor 57 being connected to the vertical deflection system of image reproducing device 23, and conductor 58 being connected to the horizontal deflection system of the image reproducing device 23. The synchronization circuit includes a combined gating and separating means comprising a pentode tube 59 having its plate connected through a load resistor 61 to a source of positive potential B+, and its cathode connected to a control grid biasing circuit comprising a capacitor 62, and a resistor 63 proportioned so that tube 59 acts as a threshold limiter or clipping device. By operating tube 59 in this fashion, it serves to strip the video or picture portion of the signal from the synchronizing pulses. Tube 59 also serves the dual function of acting as a gate for the synchronizing circuit, and for this purpose has its suppressor grid connected through a dropping resistor 64 to its cathode, and through a coupling capacitor 66 to a conductor 67 having gating pulses applied thereto in the manner hereinafter described. The plate of tube 59 is coupled through a differentiating circuit comprising a capacitor 68 and a resistor 69 to an oscillator including a triode 71. Oscillator 71 is identical in construction to the oscillator described in relation to the synchronizing circuit illustrated in Fig. 1, and generates an oscillatory signal having a frequency equal to the repetition frequency of the line or horizontal synchronizing pulses, and that derives a pulse wave in its output which is locked in phase with the incoming synchronizing pulses. The output of oscillator 71 is coupled to a synchronizing sweep generator 72 which includes a blocking oscillator and wave shaping circuits for developing a substantially sawtooth wave having a frequency equal to the repetition frequency of the horizontal synchronizing pulses, and substantially in phase with the synchronizing pulses. The output of generator 72 is coupled through a conductor 58 to the horizontal deflection system of an image reproducing device, such as 23 of Fig. 1, and is also coupled across a voltage dividing network 73 and 74 having its midtap connected to the conductor 67. By this construction, a gating signal is developed across voltage dividing network 73 and 74 which is applied to the suppressor grid of pentode tube 59 for controlling the flow of plate current of tube 59.

From the foregoing description, it is apparent that the gating of tube 59 is accomplished in substantially the same manner as gating of the pentode tube 29 in the system illustrated in Fig. 1. With the exception of the lack of wave shaping circuitry for deriving the gating signal, and the use of a single tube to accomplish both the clipping and gating operations, the system shown in Fig. 3 is equivalent to that shown in Fig. 1. Thus, a synchronization system is provided which requires only two tubes for providing synchronization signal separation and for providing a satisfactory synchronizing wave for the generator 72.

The synchronization circuit of Fig. 3, also includes a means for providing gating of the vertical synchronizing pulses, and for this purpose the tube 59 has its screen grid connected through a resistor 76 to a source of positive potential B+, and to an integrating circuit comprising capacitor 77, resistor 78 and capacitor 79. Integrating circuit 77, 78 and 79 serves to integrate the serrated, vertical, synchronizing and equalizing pulses of the received television signal, and to produce a pulse output wave form having a repetition frequency equal to the repetition frequency of the received vertical synchronizing pulses. Integrating circuit 77, 78 and 79 is coupled to the cathode of one triode section 83 of duo-triode tube. Triode section 83 has its control grid connected through a resistor 84 to ground, and its plate coupled across a capacitor 86 to the cathode of a blocking oscillator of any standard construction and including a triode 87. Oscillator 87 serves to develop a sawtooth scanning wave having a frequency equal to the repetition frequency of the vertical synchronizing pulses, which is coupled through wave shaping circuits, indicated at 88, for further shaping the sawtooth wave to the vertical deflection system of image reproducing device. The output of the wave shaping circuit 88 is also coupled through a limiting resistor 89 to a cascade integrating means including a pair of integrating circuits connected in series, and comprising a capacitor 91 and resistor 92, and a capacitor 93 and resistor 94, respectively. The output of the cascade integrating means is connected to the control grid of a triode section 96 of the duo-triode including triode section 83. Triode section 96 has its plate connected through a load resistor 97 to the source of positive potential B+, and is biased to operate as a peak limiting amplifier by a cathode biasing circuit including a resistor 98 and a capacitor 99. The plate of triode section 96 is connected to the control grid of triode section 83, and serves to apply positive gating pulses to triode section 83 to control its operation.

Figure 4:
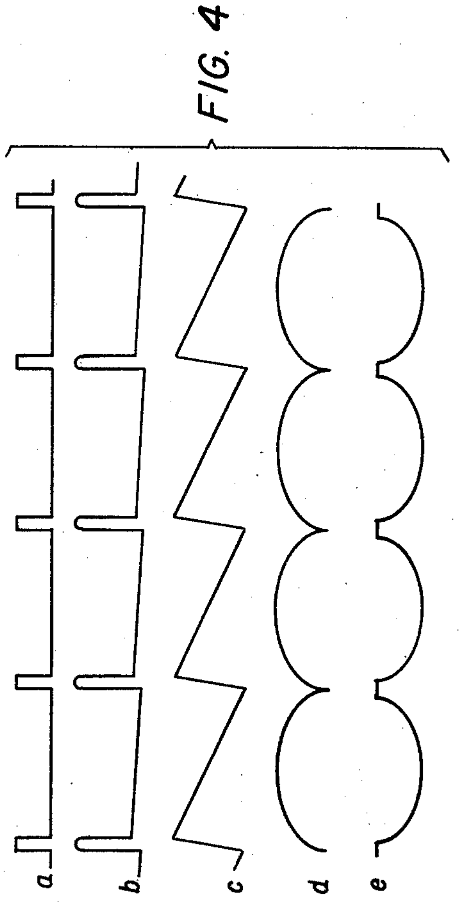
Fig. 4 is a graph illustrating the signal wave form in various stages of a portion of the synchronization circuit shown in Fig. 3.

In operation, the vertical synchronizing pulses are derived from the screen grid current of pentode tube 59, and integrated by integrating circuit 77, 78 and 79. The integrated, vertical synchronizing pulses are then applied to the cathode of gating tube 83. As gating tube 83 has its control grid connected to ground through resistor 84, it passes current only if the cathode receives a negative signal from voltage dividing resistor 82, and a positive gating signal is applied to its control grid from peak limiting tube 96. The necessary gating signal for tube 83 is obtained from the output of the wave shaping circuit 88, and applied through cascade integrating circuit 91, 92, 93 and 94 to the control grid of peak limiting tube 96. Referring now to Fig. 4, curves *a* to *e* show how a suitable vertical gating signal is obtained from the output of the wave shaping circuit for application to the gating tube 83. Curve *a* shows the incoming vertical synchronizing pulses after integration by integrating circuit 77 to 79, and containing noise signals. Curve *b* shows the vertical retrace voltage obtained from the output of wave shaping circuit 88, and curves *c* and *d* illustrate the result of the first integration obtained by integrating circuits 91 and 92, and the results of the second integration obtained by integrating circuit 93 and 94, respectively. The voltage obtained at the output of the cascade integrating circuit is shown in curve *d*, and consists of a series of parabolic arcs which, upon being fed into peak limiting amplifier 96, are inverted, clipped, and greatly amplified, appearing in the plate of tube 96 in the form shown in curve *e*. Because of the substantially square top of this output gating signal, a limited amount of phase variation between the incoming synchronizing pulses and the gating signal can be tolerated, and gating of triode 83 will nevertheless occur. Due to the fact that tube 96 serves to amplify the gating signal, the peak voltage of the gating signal will be sufficiently high to allow the vertical synchronization circuit to handle noise pulses having considerable amplitude.

From the preceding description, it can be appreciated that the synchronization circuit illustrated in Fig. 3 provides the maximum noise rejection in both the horizontal synchronizing channel, and in the vertical synchronizing channel, of a television receiver. By this circuit horizontal pulling of the picture or horizontal tearing or scalloping of the picture is prevented by the gating feature provided by pentode clipping tube 59 and locking oscillator 71, in the manner described with relation to Fig. 1. Also, vertical bounce, as well as rolling of the picture, is prevented by gating tube 83 and its associated gating signal deriving circuit. Thus, the invention makes available a synchronization circuit incorporating two-dimensional gating for use in a television receiver, which requires a lesser number of tubes than circuits utilizing standard frequency discriminating means; thereby providing a synchronization circuit having improved operation over conventional circuits of the same type, and yet less expensive to manufacture.

Figure 5:
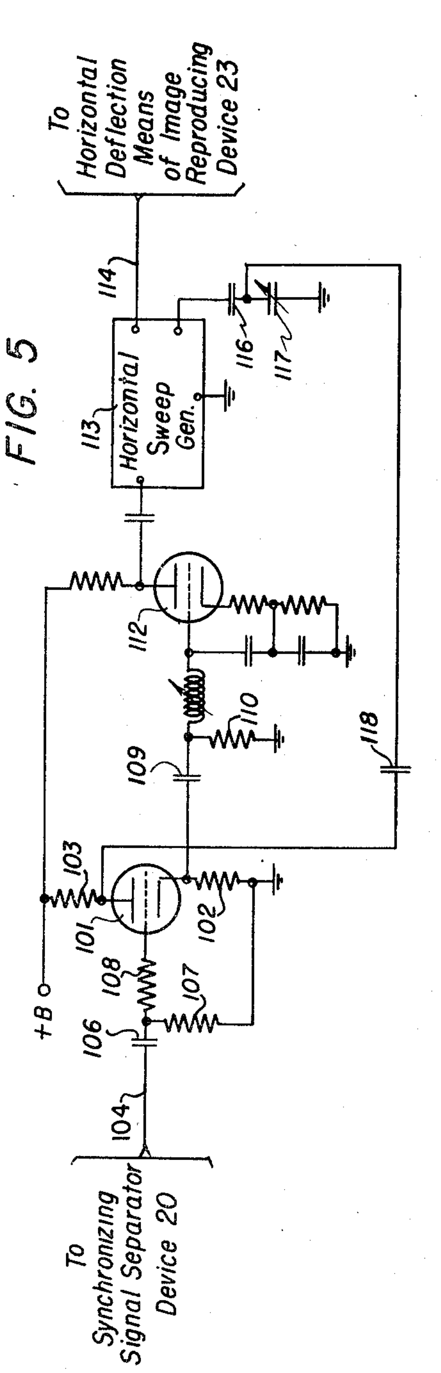
Fig. 5 illustrates still another synchronization circuit constructed in accordance with the invention, and suitable for use in the system of Fig. 1.

Adverting next to Fig. 5, another embodiment of the gating means for use in the horizontal synchronization circuit of the television receiving system illustrated in Fig. 1, is disclosed. The gating means comprises a triode tube 101 having a load resistor 102 connected in its cathode circuit, and its plate connected through a plate load resistor 103 to a source of positive potential B+. Synchronizing signals are obtained from a synchronizing signal separating or clipping device, such as 20 of Fig. 1, and connected through a conductor 104, a coupling capacitor 106, a leak resistor 107, and a limiting resistor 108 to the control grid of triode 101. Capacitor 106, leak resistor 107, and limiting resistor 108 are so proportioned, that triode 101 operates as a grid leak detector, with the clipped output being obtained from cathode load ressitor 102. Cathode load resistor 102 is coupled through a differentiating network comprising capacitor 109 and resistor 110, to the tank circuit of an oscillator including a triode 112. Oscillator 112 may be substantially identical to the oscillator 47 of Fig. 1 and operates at a frequency substantially equal to the repetition frequency of the incoming horizontal synchronizing pulses. The output of oscillator 112 is applied through a coupling capacitor to a line or horizontal sweep generator 113 generally similar to the generator 49 of Fig. 1. The output wave from generator 113 is then connected through conductor 114 to the horizontal deflecting device of an image reproducing device, such as 23 of Fig. 1. The output scanning wave of sweep generator 113 is also applied across a voltage dividing bridge comprising a pair of capacitors 116 and 117 that is coupled through a capacitor 118 to the plate of triode gating tube 101.

As the operation of the circuit shown in Fig. 5 is similar to the operation of the circuits shown in Figs. 1 and 3, a discussion of its operation is not considered essential. It should be noted, however, that the synchronization circuit of Fig. 5 has the advantages that servicing of a television receiver incorporating a synchronization circuit of the gated, locked in oscillator type, is rendered easier. This is because grid rectification of the incoming synchronizing pulses by grid leak detector 101 may allow a sufficient synchronizing voltage to be developed across cathode load resistor 102 to allow locked in oscillator 112 to be locked in phase with the received synchronizing pulses. This results in providing sufficient synchronization to allow a picture of some sort to be reproduced on the image reproducing device, thereby indicating to a serviceman just where the trouble lies. While this type of circuit allows some noise to get through the gate, it is felt that the simplified servicing obtained by use of the circuit overweighs this disadvantage in most applications. This is particularly true since the voltage appearing across load resistor 102 due to grid rectification alone, although sufficient to synchronize oscillator 112 in the absence of an in-phase gating signal, is not sufficient to allow noise pulses to take control away from a properly phased gating and synchronizing signal. Therefore, the noise rejection quality of the gated oscillator is not substantially impaired.

Figure 6:
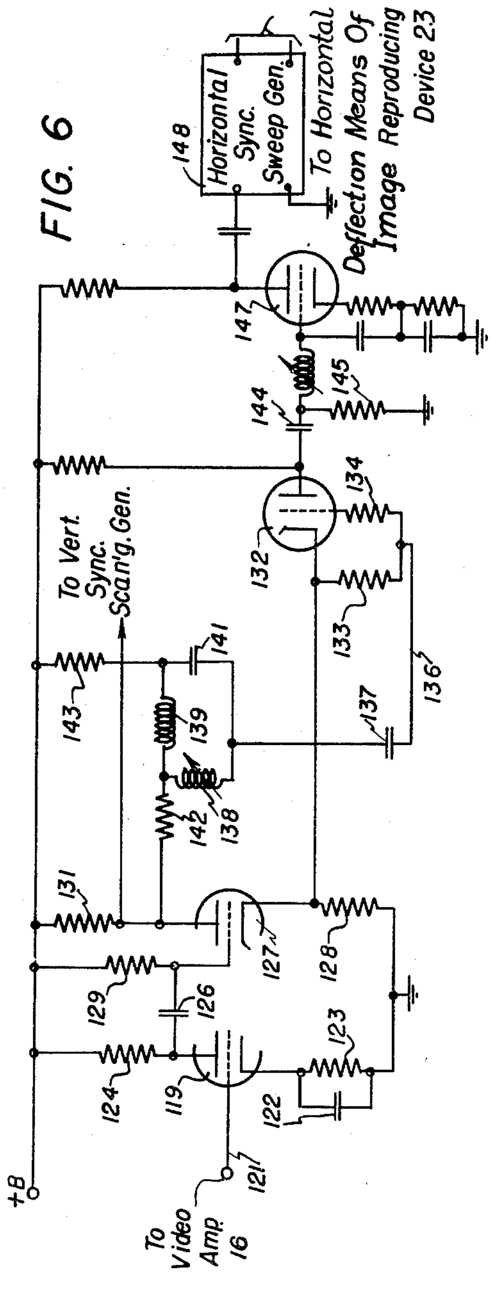
Fig. 6 shows a still further embodiment of the invention for use in a television receiver.

With reference now to Fig. 6 of the drawings, still another synchronization circuit is disclosed wherein an improved signal to noise ratio is obtained by controlling the application of received synchronizing pulses to an oscillator adapted to be locked in phase with the said synchronizing pulses. The synchronization circuit includes a two stage synchronization signal separator comprising duo-triode consisting of a first triode section 119 having its control grid connected through a conductor 121 to the output of a video amplifier of a television receiver, such as 16 of Figure 1, or to an impedance matching network of a television receiver, such as 18 of Fig. 1. Triode 119 has a control grid biasing circuit comprising a capacitor 122 and a resistor 123 connected in its cathode circuit, and has its plate connected through a load resistor 124 to a source of plate potential B+. The plate of triode 119 is also coupled through a coupling capacitor 126 to the control grid of the second triode section 127 of the duo-triode. Triode section 127 has a load resistor 128 connected in its cathode circuit, its control grid connected through a voltage dropping resistor 129 to the source of positive potential B+, and has its plate connected through a load resistor 131 to said source of positive potential. Because of their circuit parameters, triode 119 operates as a threshold limiter or clipper, and triode 127 operates as a saturation limiter, the two together acting to strip the composite video signal applied through conductor 121 of the video portion of the signal, and to develop across cathode load resistor 128, and plate load resistor 131 the desired synchronizing pulses. The vertical synchronizing pulses are then obtained from plate load resistor 131, and fed through the vertical synchronizing channel of the receiver to the vertical deflecting means of the image reproducing device. The horizontal or line synchronizing pulses are obtained from cathode load resistor 128, and applied to the horizontal deflecting means of the image reproducing device as will be explained.

The horizontal deflecting means includes a triode gating tube 132 having the cathode and control grid thereof coupled through resistors 133, and 134, respectively, in common to a conductor 136, and through a coupling capacitor 137, to a tank circuit comprising a pair of inductances 138 and 139, and a capacitance 141. This circuit is also connected through a resistor 142 to the plate of triode 127, and through a resistor 143 to the source of positive plate potential B+. Tank circuit 138, 139 and 141 is tuned to a frequency equal to the repetition frequency of the received horizontal synchronizing pulses, and, because of the manner of its connection in the plate circuit of triode 127, is shock excited by the square wave pulses appearing in the plate of triode 127. By proper adjustment of one of the inductances 138, the oscillatory signal developed in the tank circuit can be adjusted so that it is substantially in phase with the incoming synchronizing pulses, and is used to control gating tube 132 to render the same conductive simultaneously with the receipt of a synchronizing pulse. The output of gating tube 132 is coupled through a differentiating circuit 144 and 145 to the tank circuit of a locked in oscillator including triode 147. As the construction and operation of locked in oscillator 147 has been previously described, a discussion of its features is not thought to be necessary except to mention that its output signal is locked in phase with the gated synchronizing pulses in substantially the same manner as the circuit described with relation to Fig. 1. The output of oscillator 147 is coupled to a horizontal scanning wave generator 148, and controls the operation of generator 148 to produce a sawtooth waveform that is applied to the horizontal deflection means of an image reproducing device, such as 23 of Fig. 1. By constructing the synchronization circuit in this manner, it is possible to obtain benefits of a gated, locked in oscillator synchronization by deriving a gating signal from the incoming synchronizing pulses directly. Thus, should it be undesirable or impractical to derive a gating signal by any of the previously described circuits, the advantages of such a system can be obtained in this manner.

From the foregoing description, it can be appreciated that the invention provides an improved synchronization circuit having a locked in oscillator tuned to the repetition frequency of received horizontal line synchronizing pulses, and with the synchronization pulses being applied thereto through gating means. Gating of the oscillator prevents improper triggering of the scanning wave generator and its consequent horizontal pulling or tearing of the picture presentation due to noise or unclipped video signals, and results in a greatly improved noise rejection characteristic. Further, the invention provides a means for preventing the vertical bounce or jitter due to premature retrace or the like by providing a gating means for controlling the application of the received vertical synchronizing pulses to the vertical scanning signal generator. This greatly improves the noise rejection of the vertical synchronizing channel, and when utilized in connection with the described horizontal synchronizing system, provides a greatly improved picture presentation. In addition to the above features, the invention provides these advantages in a system utilizing a fewer number of electron discharge tubes and components than required in the standard systems for producing the same general result utilizing conventional discriminator type noise rejecting circuits. Thus, not only does the invention provide a system having greatly improved noise rejecting qualities, but provides such a system at a lower cost.

Obviously, other modifications and variations of the present invention are possible in the light of the above teachings. It is therefore to be understood that changes may be made herein which are within the full intended scope of the invention as defined by the appended claims.

I claim:

1. In a television receiver, a synchronization circuit for providing a scanning wave synchronized with the horizontal synchronization pulses of a received television signal including in combination, a sine wave oscillator having an input circuit tuned to the repetition frequency of the horizontal synchronization pulses and an output circuit, gate means connected to said input circuit of said oscillator for applying received horizontal synchronization pulses thereto, said oscillator being adapted to be locked in phase with a plurality of received horizontal synchronizing pulses and providing a wave in said output circuit having a predetermined phase relationship with respect to the applied synchronization pulses, scanning means connected to said output circuit of said oscillator for developing a sawtooth scanning wave, means coupled to said scanning means for providing gating pulses having substantially the same phase as the received synchronization pulses, and means for applying said gating pulses to said gate means for controlling the same, said gate means operating to apply received signals to said oscillator only during the presence of said gating pulses.

2. In a television receiver, a synchronization circuit for providing a scanning wave synchronized with the horizontal synchronization pulses of a received television signal including in combination, a sine wave oscillator having an input circuit tuned to the repetition frequency of the horizontal synchronization pulses and an output circuit, gate means connected to said input circuit of said oscillator for applying received horizontal synchronization pulses thereto, said oscillator being adapted to be locked in phase with a plurality of received horizontal synchronizing pulses and providing a wave in said output circuit having a predetermined phase relationship with respect to the applied synchronization pulses, scanning means connected to said output circuit of said oscillator for developing a sawtooth scanning wave, means coupled to said scanning means for providing gating pulses having substantially the same phase as the received synchronization pulses, and means for applying said gating pulses to said gate means for controlling the same, said gate means including bias means which renders said gate non-conducting after a predetermined time interval except during the presence of said gating pulses.

3. A synchronization circuit for producing a scanning wave synchronized with a received pulsed wave including an oscillator having an input circuit tuned to the repetition frequency of the received wave and adapted to be locked in phase with a plurality of pulses thereof, a gating electron discharge device having at least two control electrodes and an output electrode, said output electrode being coupled to said input circuit of said oscillator, means for applying said received pulsed wave to one of said control electrodes, means for developing a scanning wave coupled to said oscillator and controlled thereby, wave shaping means coupled to said scanning wave developing means and to the remaining control electrode of said discharge tube, said wave shaping means deriving gating pulses from said scanning wave having longer durations than the pulses in said received wave and starting slightly ahead of the pulses in said received wave, and biasing means coupled to said remaining control electrode for initiating conduction in said electron discharge device upon receipt of said pulsed repetitious wave and thereafter maintaining said device non-conductive except upon the simultaneous application of a gating pulse and a received pulse to said control electrodes.

4. A television receiving system including a synchronizing wave developing circuit comprising gated clipping means having at least two inputs and two outputs, means for applying a television video signal including line and field synchronizing pulses to one of said inputs, said gated clipping means separating the synchronizing pulses from the video signal, an oscillator tuned to the repetition frequency of the line synchronizing having an input and an output with the input coupled to a first output of said gated clipping means, circuit means coupling said output of said oscillator to the remaining input of said gated clipping means for controlling the operation thereof, second gate means coupled to the remaining output of said gated clipping means, means for developing a field synchronizing scanning wave coupled to said second gate means, and wave shaping means coupled between said field synchronizing scanning wave developing means and said second gate means for producing a pulse wave from said field synchronizing scanning wave for controlling the operation of said gate means.

5. The combination set forth in claim 4 wherein said wave shaping means comprises a pair of cascaded integrating circuits having an output, and a high gain peak limiting means having an input coupled to the output of said integrating circuit, said peak limiting means being coupled to said second gate means.

6. A synchronization circuit for providing a scanning wave synchronized with a received television signal including a scanning generator having an input and an output for developing a scanning wave to be applied to the scanning mechanism of a television picture tube, wave shaping means coupled to said output of said generator, said wave shaping means including a pair of cascade integrating circuits and a peak limiting amplifier having an input and an output, said integrating circuits being coupled between said output of said scanning generator and said input of said peak limiting amplifier, and gating means coupled to said input of said scanning generator for controlling the application of synchronizing pulses thereto, said peak limiting amplifier having said output thereof coupled to said gating means for controlling the operation thereof.

7. A synchronization circuit for deriving a scanning signal from a received pulsed repetitious wave including an oscillator tuned to the repetition frequency of a received pulsed repetitious wave and having an input and an output, scanning wave generating means coupled to said output of said oscillator, gating means including a grid leak detector having at least a control grid, a cathode and a plate, means for applying the received wave to said control grid, a cathode load resistor connected to said cathode, means coupling said cathode load resistor to said input of said oscillator for controlling the application of the received pulse wave to said oscillator, and circuit means coupling said scanning wave developing means to said plate of said grid leak detector for controlling the conductivity thereof and thereby controlling the application of received pulses to said oscillator.

References Cited in the file of this patent

UNITED STATES PATENTS

| Number | Name | Date |
|---|---|---|
| 2,141,343 | Campbell | Dec. 27, 1928 |
| 2,277,000 | Bingley | Mar. 17, 1942 |
| 2,515,613 | Schoenfeld | Aug. 18, 1950 |
| 2,521,504 | Dome | Sept. 5, 1950 |